(12) United States Patent
Zhang et al.

(10) Patent No.: US 7,826,945 B2
(45) Date of Patent: Nov. 2, 2010

(54) AUTOMOBILE SPEECH-RECOGNITION INTERFACE

(76) Inventors: You Zhang, c/o Bose Corporation, The Mountain, Framingham, MA (US) 01701; Jeffery J. Faneuff, c/o Bose Corporation, The Mountain, Framingham, MA (US) 01701; William Hidden, c/o Bose Corporation, The Mountain, Framingham, MA (US) 01701; James T. Hotary, c/o Bose Corporation, The Mountain, Framingham, MA (US) 01701; Steven C. Lee, 287 Bridge St., Stamford, CT (US) 06905; Vasu Iyengar, c/o Bose Corporation, The Mountain, Framingham, MA (US) 01701

( * ) Notice: Subject to any disclaimer, the term of this patent is extended or adjusted under 35 U.S.C. 154(b) by 1460 days.

(21) Appl. No.: 11/173,736

(22) Filed: Jul. 1, 2005

(65) Prior Publication Data

US 2007/0005206 A1    Jan. 4, 2007

(51) Int. Cl.
    *G06F 7/00*     (2006.01)
(52) U.S. Cl. ............... 701/36; 704/200; 704/231; 704/246; 704/273; 704/275; 715/728
(58) Field of Classification Search ............... 701/36, 701/209, 211, 213; 704/E15.45, 231, 240, 704/233–234, 236–237, 270, E15.045, 274, 704/200, 246, 270.1, 273, 275; 340/995.19; 715/728
See application file for complete search history.

(56) References Cited

U.S. PATENT DOCUMENTS

| | | | |
|---|---|---|---|
| 5,212,764 A | 5/1993 | Ariyoshi | |
| 5,452,397 A * | 9/1995 | Ittycheriah et al. | 704/240 |
| 5,640,485 A | 6/1997 | Ranta | |
| 6,061,647 A * | 5/2000 | Barrett | 704/208 |
| 6,073,101 A | 6/2000 | Maes | |
| 6,260,012 B1 | 7/2001 | Park | |
| 6,587,824 B1 * | 7/2003 | Everhart et al. | 704/275 |
| 6,622,083 B1 * | 9/2003 | Knockeart et al. | 701/202 |

(Continued)

FOREIGN PATENT DOCUMENTS

EP      1 054 387 A2    11/2000

(Continued)

OTHER PUBLICATIONS

Takao Watanabe, et al., "Unknown Utterance Rejection Using Likelihood Normalization Based on Syllable Recognition", IEICE, DII, vol. J75-D-II, No. 12, Dec. 1992, pp. 2002-2009.*

(Continued)

*Primary Examiner*—Cuong H Nguyen
(74) *Attorney, Agent, or Firm*—Bose Corporation

(57) ABSTRACT

An automotive system provides an integrated user interface for control and communication functions in an automobile or other type of vehicle. The user interface supports voice enabled interactions, as well as other modes of interaction, such as manual interactions using controls such as dashboard or steering wheel mounted controls. The system also includes interfaces to devices in the vehicle, such as wireless interfaces to mobile devices that are brought into the vehicle. The system also provides interfaces to information sources such as a remote server, for example, for accessing information.

6 Claims, 5 Drawing Sheets

U.S. PATENT DOCUMENTS

Figure 1:
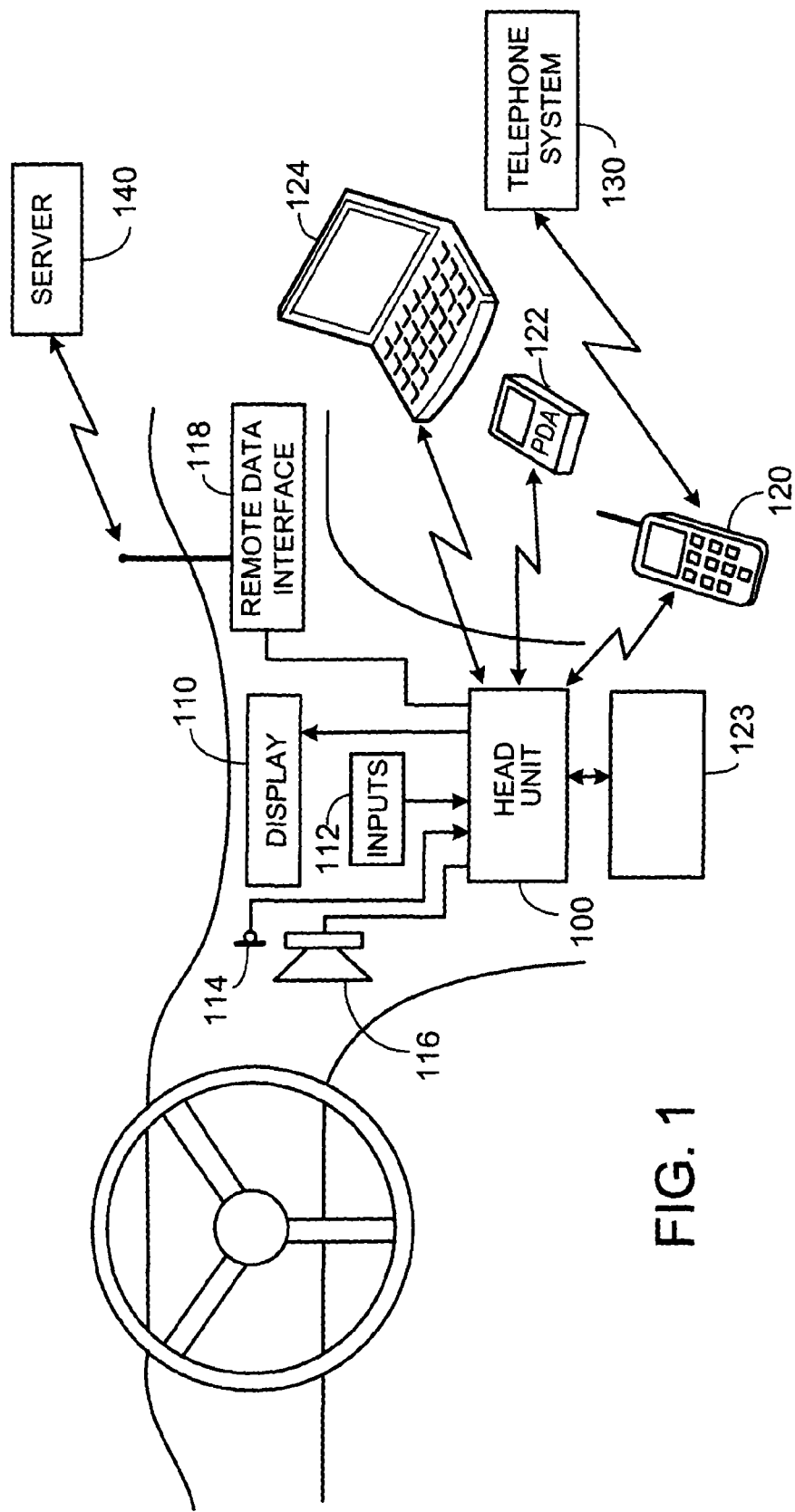

| | | | |
|---|---|---|---|
| 6,707,421 | B1 | 3/2004 | Drury et al. |
| 6,711,543 | B2 | 3/2004 | Cameron |
| 6,978,237 | B2 * | 12/2005 | Tachimori et al. ........... 704/238 |
| 2002/0069071 | A1 | 6/2002 | Knockeart et al. |
| 2002/0091518 | A1 | 7/2002 | Baruch et al. |
| 2002/0143548 | A1 * | 10/2002 | Korall et al. ................ 704/270 |
| 2002/0152264 | A1 | 10/2002 | Yamasaki |
| 2002/0184030 | A1 * | 12/2002 | Brittan et al. ............... 704/260 |
| 2003/0018475 | A1 * | 1/2003 | Basu et al. ................... 704/270 |
| 2003/0023371 | A1 | 1/2003 | Stephens |
| 2003/0110057 | A1 | 6/2003 | Pisz |
| 2003/0125943 | A1 * | 7/2003 | Koshiba ..................... 704/238 |
| 2004/0049375 | A1 * | 3/2004 | Brittan et al. .................. 704/9 |
| 2005/0080613 | A1 * | 4/2005 | Colledge et al. ............... 704/9 |
| 2005/0135573 | A1 | 6/2005 | Harwood et al. |
| 2006/0058947 | A1 * | 3/2006 | Schalk ....................... 701/207 |
| 2007/0005206 | A1 * | 1/2007 | Zhang et al. .................. 701/36 |

FOREIGN PATENT DOCUMENTS

| | | |
|---|---|---|
| EP | 1 054 387 A3 | 11/2001 |
| EP | 1 246 086 | 10/2002 |
| EP | 1 403 852 B1 | 3/2005 |
| JP | 2001-401615 * | 12/2001 |
| WO | 99/14928 | 3/1999 |
| WO | WO 03/030148 | 4/2003 |

OTHER PUBLICATIONS

McAuley, "Optimum Speech Classification and Its Application to Adaptive Noise Cancellation", M.I.T. Lincoln Lab, Lexington, Massachusetts, pp. 425-426.*

Atal et al, "A Pattern Recognition Approach to Voice-Unvoiced-Silence Classification with Applications to speech Recognition" IEEE Transactions on Acoustics, Speech, and Signal Processing, vol. ASSP-24, No. 3, Jun. 1976, pp. 201-202.*

Rabiner et al, "Evaluation of a Statistical Approach to Voiced-Silence Analysis for Telephone-Quality Speech", The Bell System Technical Journal, vol. 56, No. 3, Mar. 1997, pp. 455-481.*

A robust adaptive speech enhancement system for vehicular applications; Jwu-Sheng Hu; Chieh-Cheng Cheng; Wei-Han Liu; Chia-Hsing Yang; Consumer Electronics, IEEE Transactions on; vol. 52, Issue: 3; Digital Object Identifier: 10.1109/TCE.2006.1706509; Publication Year: 2006, pp. 1069-1077.*

Environmental Sniffing: Noise Knowledge Estimation for Robust Speech Systems; Akbacak, M.; Hansen, J. H. L.; Audio, Speech, and Language Processing, IEEE Transactions on; vol. 15, Issue: 2; Digital Object Identifier: 10.1109/TASL.2006.881694; Publication Year: 2007, pp. 465-477.*

Assessment of speech dialog systems using multi-modal cognitive load analysis and driving performance metrics; Kleinschmidt et al. ; Vehicular Electronics and Safety (ICVES), 2009 IEEE International Conference on; Digital Object Identifier: 10.1109/ICVES.2009.5400232; Publication Year: 2009 ,pp. 162-167.*

Improved Histogram Equalzaiton (HEQ) for Robust Speech Recogntion; Shih-Hsiang Lin et al.; Multimedia and Expo, 2007 IEEE International Conference on;Digital Object Identifier: 10.1109/ICME.2007.4285130; Publication Year: 2007, pp. 2234-2237.*

Missing-Feature Reconstruction by Leveraging Temporal Spectral Correlation for Robust Speech Recognition in Background Noise Conditions; Kim, W.; Hansen, J.; Audio, Speech, and Language Processing, IEEE Transactions on; vol. 18, Issue: 8 Digital Object Identifier: 10.1109/TASL.2010.2041698; Publication Year: 2010, pp. 2111-2120.*

On-Line Feature and Acoustic Model Space Compensation for Robust Speech Recognition in Car Environment; Miguel, A. et al.; Intelligent Vehicles Symposium, 2007 IEEE; Digital Object Identifier: 10.1109/IVS.2007.4290250; Publication Year: 2007, pp. 1019-1024.*

FPGA implementation of spectral subtraction for in-car speech enhancement and recognition; Whittington, J. et al.; Signal Processing and Communication Systems, 2008. ICSPCS 2008. 2nd International Conference on; Digital Object Identifier: 10.1109/ICSPCS.2008.4813714; Publication Year: 2008, pp. 1-8.*

Speech based emotion classification framework for driver assistance system; Tawari, Ashish et al.; Intelligent Vehicles Symposium (IV), 2010 IEEE; Digital Object Identifier: 10.1109/IVS.2010.5547956; Publication Year: 2010, pp. 174-178.*

The Australian English Speech Corpus for In-Car Speech processing; Kleinschmidt, T. et al; Acoustics, Speech and Signal Processing, 2009. ICASSP 2009. IEEE International Conference on; Digital Object Identifier: 10.1109/ICASSP.2009.4960549 Publication Year: 2009, pp. 4177-4180.*

Joint Acoustic-Video Fingerprinting of Vehicles, Part II; Cevher, V.; Guo, F. et al; Acoustics, Speech and Signal Processing, 2007. ICASSP 2007. IEEE International Conference on; vol. 2; Digital Object Identifier: 10.1109/ICASSP.2007.366344 Publication Year: 2007, pp. II-749-II-752.*

Implementation of speech recognition on MCS51 microcontroller for controlling wheelchair; Thiang; Intelligent and Advanced Systems, 2007. ICIAS 2007. International Conference on; Digital Object Identifier: 10.1109/ICIAS.2007.4658573 Publication Year: 2007, pp. 1193-1198.*

"User's Guide for Nokia 7610" [Online] Nokia, copyright 2004, retrieved from the Internet: <URL:http://nds2.nokia.com/files/support/apac/phones/guides/Nokia_7610_APAC_UG_en_v2.pdf>.

European Search Report dated May 14, 2008 from European Application No. 06116015.6.

Sharon Oviatt and Philip Cohen, MultiModal Interfaces That Process What Comes Naturally, Communications of the ACM, Mar. 2000/ vol. 43 No. 3, pp. 45-53.

Stephanie Seneff and Chao Wang, Automatic Acquisition of Names Using Speak and Spell Mode in Spoken Dialogue Systems, MIT Laboratory for Computer Science, Mar. 2003, pp. 495-496.

Christian Gehrmann, Bluetooth Security White Paper, Bluetooth SIG Security Expert Group, Apr. 19, 2002, Revision 1.00, pp. 1-46.

Roberto Pieraccini, et al., A Multimodal Conversational interface for a Concept Vehicle, SpeechWorks International, 55 Broad Street, NY, NY, Eurospeech 2003.

Kris Demuynck and Tom Laureys, A Comparison of Different Approaches to Automatic Speech Segmentation, K.U. Leuven ESAT/ PSI, Kasteelpark Arenbergweg 10, B-3001 Leuven, Belgium, http://www.esat.kuleuven.ac.be/~spch.

Search Report from counterpart European application No. 06116015.6 dated Mar. 19, 2008.

* cited by examiner

AUTOMOBILE SPEECH-RECOGNITION INTERFACE

BACKGROUND

This invention relates to an automobile interface.

Automobiles today support a variety of interfaces for user interaction. The interfaces provide a user with access to information (e.g., navigation, vehicle status), communication (e.g., cellular telephone calls), or control (e.g., control of vehicle systems such as climate control). Such systems may be hosted within the automobile or hosted remotely from the automobile and accessed over a communication system. Speech recognition has been used in automobiles to enable spoken interactions between a person in an automobile and such systems.

Automobiles today provide some interfaces for integration of external devices such as cellular telephones. For example, such interfaces with external devices may use wireless links such as Bluetooth between the external devices and automobile systems.

SUMMARY

In one aspect, in general, a voice enabled user interface provides for storing general configuration information for the interface and storing user-specific configuration information for the interface. Processing of a speech input from a user is enabled using the general configuration information and the user-specific configuration information. The user-specific configuration information is selectively updated based on a result of processing the speech input.

This aspect can include one or more of the following features.

The updating is performed on correct recognition of the input when a score associated with the input indicates that an incorrect recognition hypothesis has a score within a predetermined threshold.

The updating is performed without requiring further speech input from the user.

The user-specific configuration information includes user-specific pronunciation information for lexical items for which general pronunciation information is included in the general configuration information.

Updating the user-specific configuration information is performed during use of the interface.

The updating is based on mis-recognition of the speech input from the user.

Updating the user-specific configuration information is based on results of recognition of a speech input from the user.

In another aspect, in general, a voice enabled user interface is configured to process an utterance of an identifier in conjunction with redundant or disambiguating information associated with the identifier. The interface can retrieve the additional or disambiguating information from a database associating the identifier with said information. For example, the database includes a contact database. The redundant or ambiguous information can be directly concatenated with the identifier. As an example, the identifier includes a name, and the redundant or disambiguating information includes initials of the name.

In another aspect, in general, a method for providing a voice enabled user interface includes providing configuration information for each of a set of users of the interface. A user of the interface is determined and the interface is adapted using the configuration information for the determined user. Determining the user can includes applying a speaker identification process to a spoken input from the user.

In another aspect, in general, a method of associating a first device and a second device over a communication medium involves generating data at the first device, presenting the data generated at the first device to a user, and transmitting an associating request to the second device. On the second device, the data is accepted as input from the user permitting the association of the first and the second devices.

This aspect can include one or more of the following features.

The first device is a vehicle-based device and the second device is a mobile device. For example, the mobile device is one of a mobile telephone and a PDA.

The method further includes a step of initiating by pressing a button on the first device.

Associating the first device and the second device is according to a Bluetooth communication approach.

In another aspect, in general, a method for configuring a voice enabled user interface includes at a first device, receiving contact data from a second device and requesting additional data from a data source to augment the contact data. The user interface is configured using the received contact data from the second device and the additional data from the data source.

This aspect can include one or more of the following features.

The first device is a vehicle-based device and the second device is a mobile device.

The data source resides at a remote server.

The additional data requested from the remote server includes information related to an entry in the contact data. For example, the entry in the contact data includes a name and associated telephone number, and the requested additional data includes address information associated with the entry.

In another aspect, in general, a method for providing an in-vehicle voice enabled user interface includes accepting a communication command from a user. Destination information is then determined from the communication command. A navigation system is then commanded based on the determined destination information.

This aspect can include one or more of the following features.

The communication command includes a telephone dialing command.

A route to the destination is determined from the communication command.

The communication command includes a spoken command.

The determining is based on an association between the communication command and the destination information in a contact database.

In another aspect, in general, a method for providing an in-vehicle voice enabled user interface includes obtaining text street information from a navigation system and converting the text street information into its spoken equivalent. The spoken equivalent is then presented to the user.

In another aspect, in general, a method for providing an in-vehicle voice enabled interface includes presenting a visual cue to a user on a graphic display. The visual cue is suitable for detection by the user in the user's peripheral vision without requiring the user to look directly at the display.

This aspect can include one or more of the following features.

The visual cue is related to a state of the spoken interface.

Presenting the visual cue includes providing an indication that the spoken interface is in a state to accept a spoken command, for example, providing an indication that the spoken interface has accepted a spoken command from the user.

In another aspect, in general, a method for providing an in-vehicle voice enabled interface includes adjusting one or more control settings related to an acoustic environment at an onset of a spoken interaction, including recording the control settings prior to adjustment, and restoring the control settings after the spoken interaction.

The control settings can include a volume setting, for example, including a speech volume setting or a setting for a noise-generating device. The noise-generating device can include a fan.

In another aspect, in general, a method for providing a multi-modal in-vehicle user interface includes accepting a first part of a command in a first interaction mode, detecting a condition associated with the user interface, determining a second interaction mode based on the detected condition, and accepting a second part of the command in the second interaction mode. The first interaction mode and the second interaction mode are each one of a spoken interaction mode and a manual interaction mode.

This aspect can include one or more of the following features.

The method further includes presenting to the user information substantially related to only a single one of the first interaction mode and the second interaction mode.

Detecting the condition associated with the user interface includes detecting a noise level in the environment of the user interface.

Accepting the first part of the command and accepting the second part of the command are performed to provide a continuous entry of the command without requiring repetition of the first part of the command.

In another aspect, in general, a method for providing a voice enabled user interface includes accepting text specifications of vocabulary items, determining pronunciations for the vocabulary items, accepting a spoken input from a user, and automatically recognizing vocabulary items in the spoken input using the determined pronunciations. If a score associated with the recognized vocabulary items falls in a predetermined range, a pronunciation of one or more of the vocabulary items is determined from the accepted spoken input.

In another aspect, in general, a method for establishing an association between devices includes initiating an associating procedure at a first device, detecting one or more candidate devices at the first device, accepting a selection of a second device of the candidate devices from a user, providing associating information to the user from the first device, transmitting a request from the first device to the second device, and accepting the associating information from the user at the second device.

Other features and advantages are apparent from the following description, and from the claims.

DESCRIPTION

Figure 2:
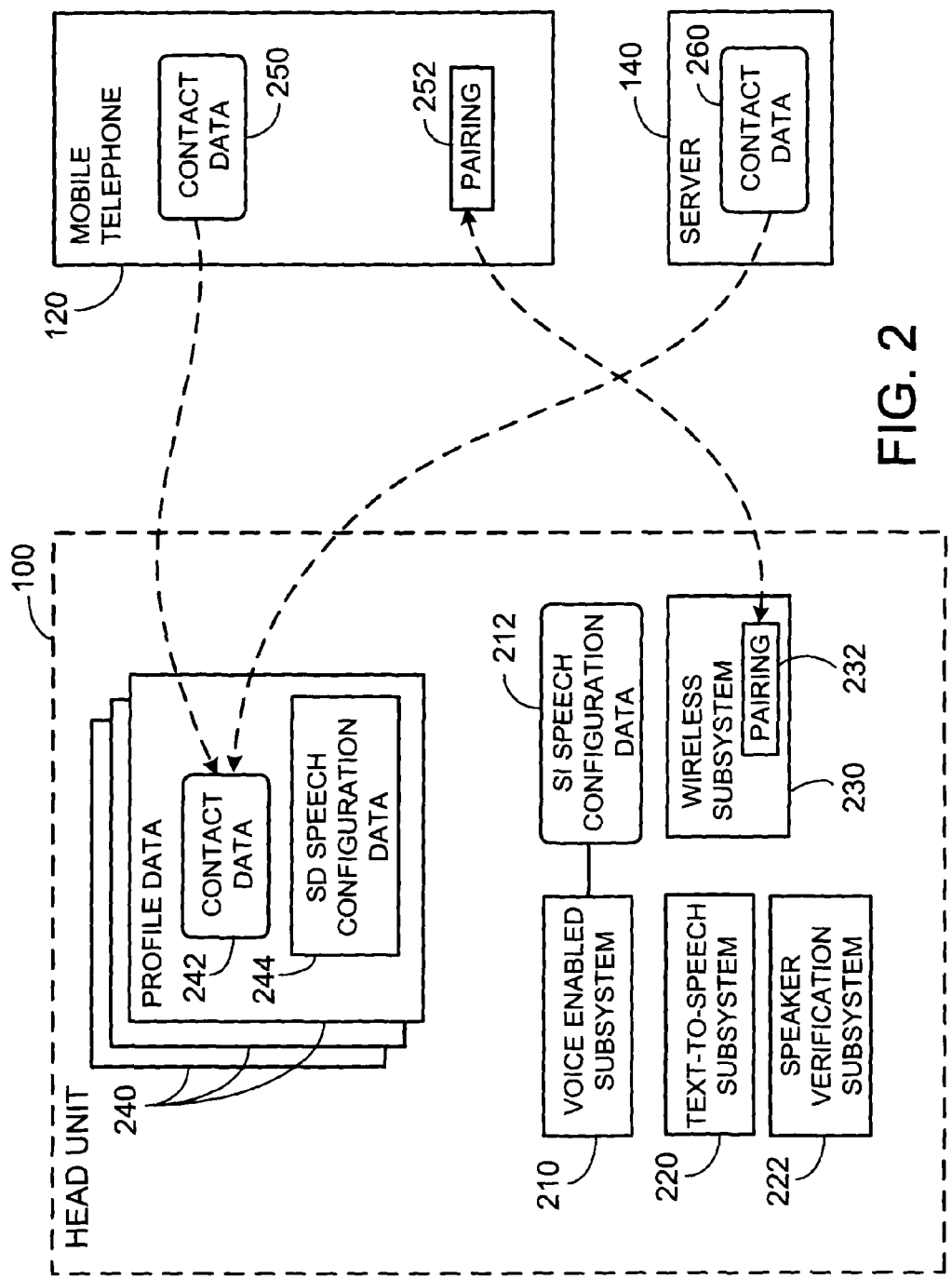
Figure 3:
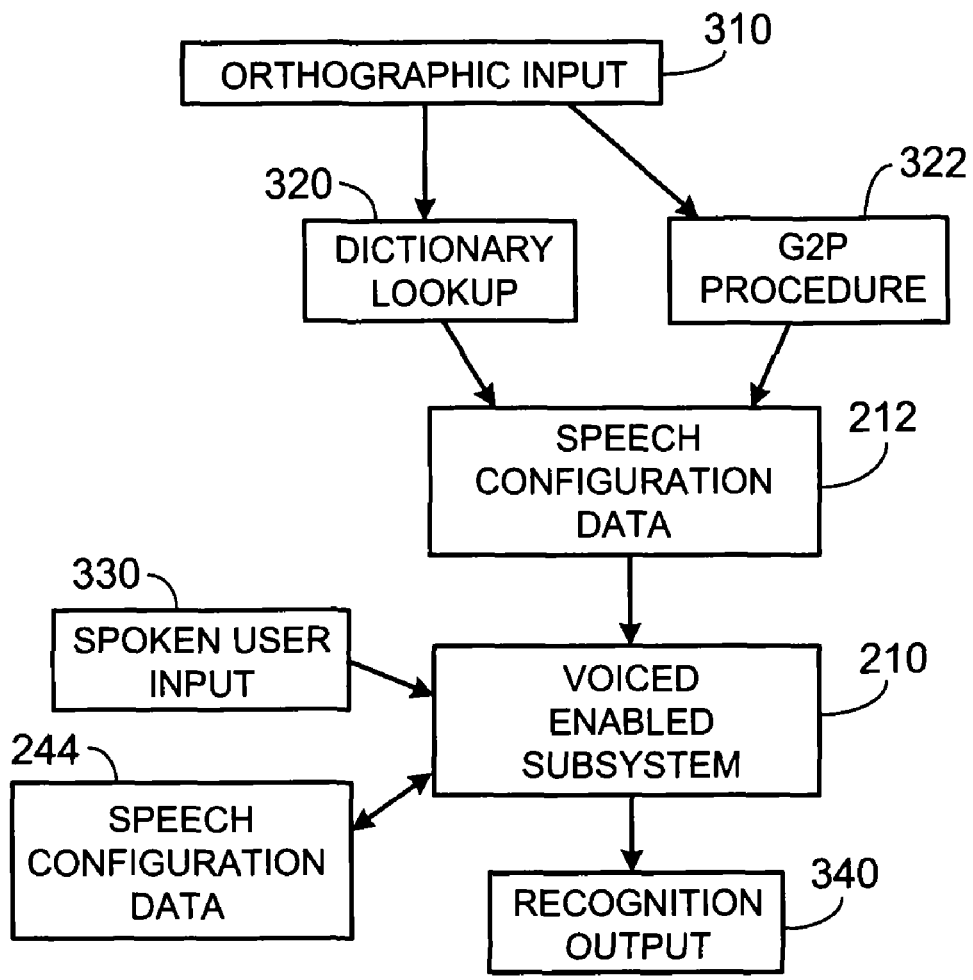
Figure 4:
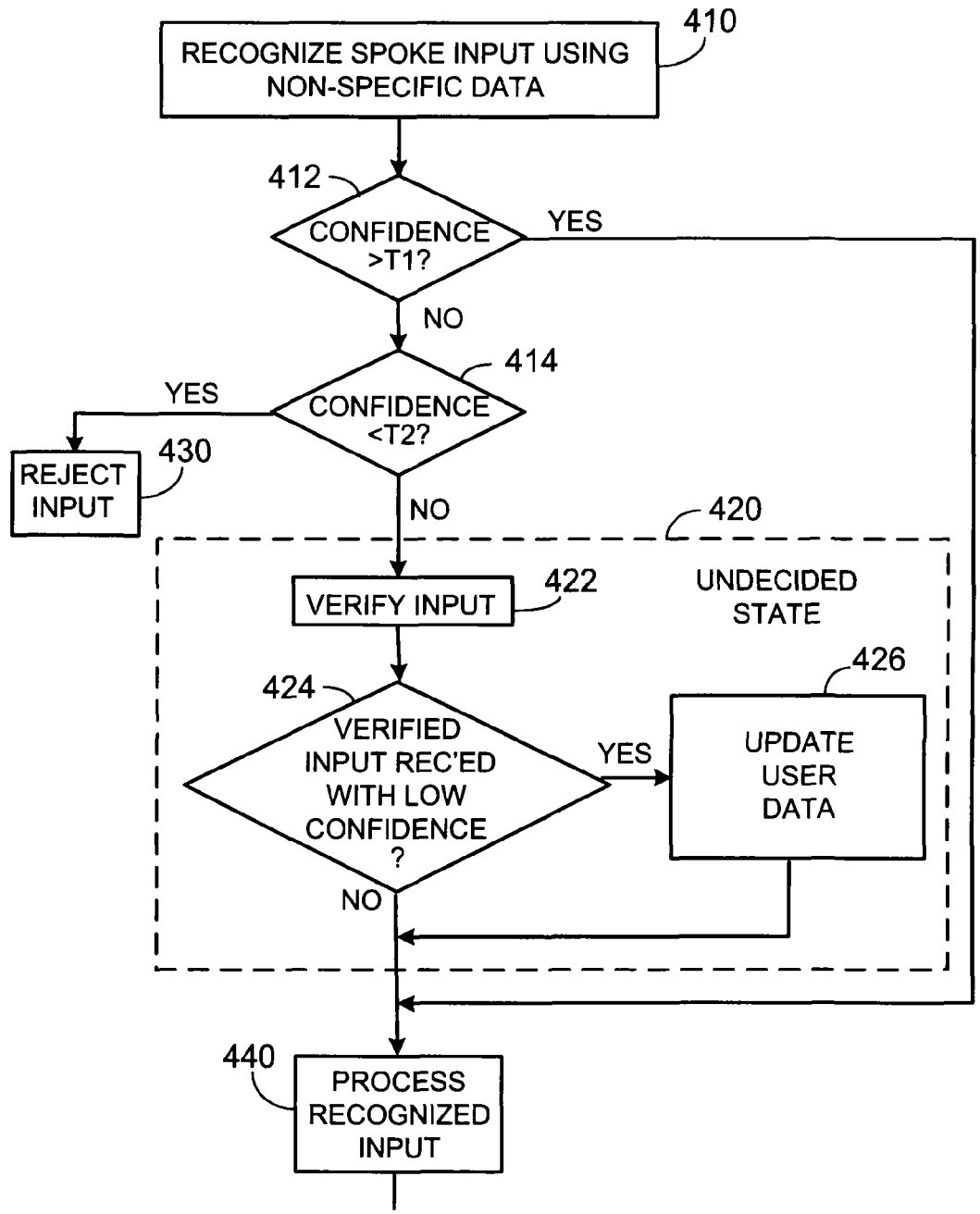
Figure 5:
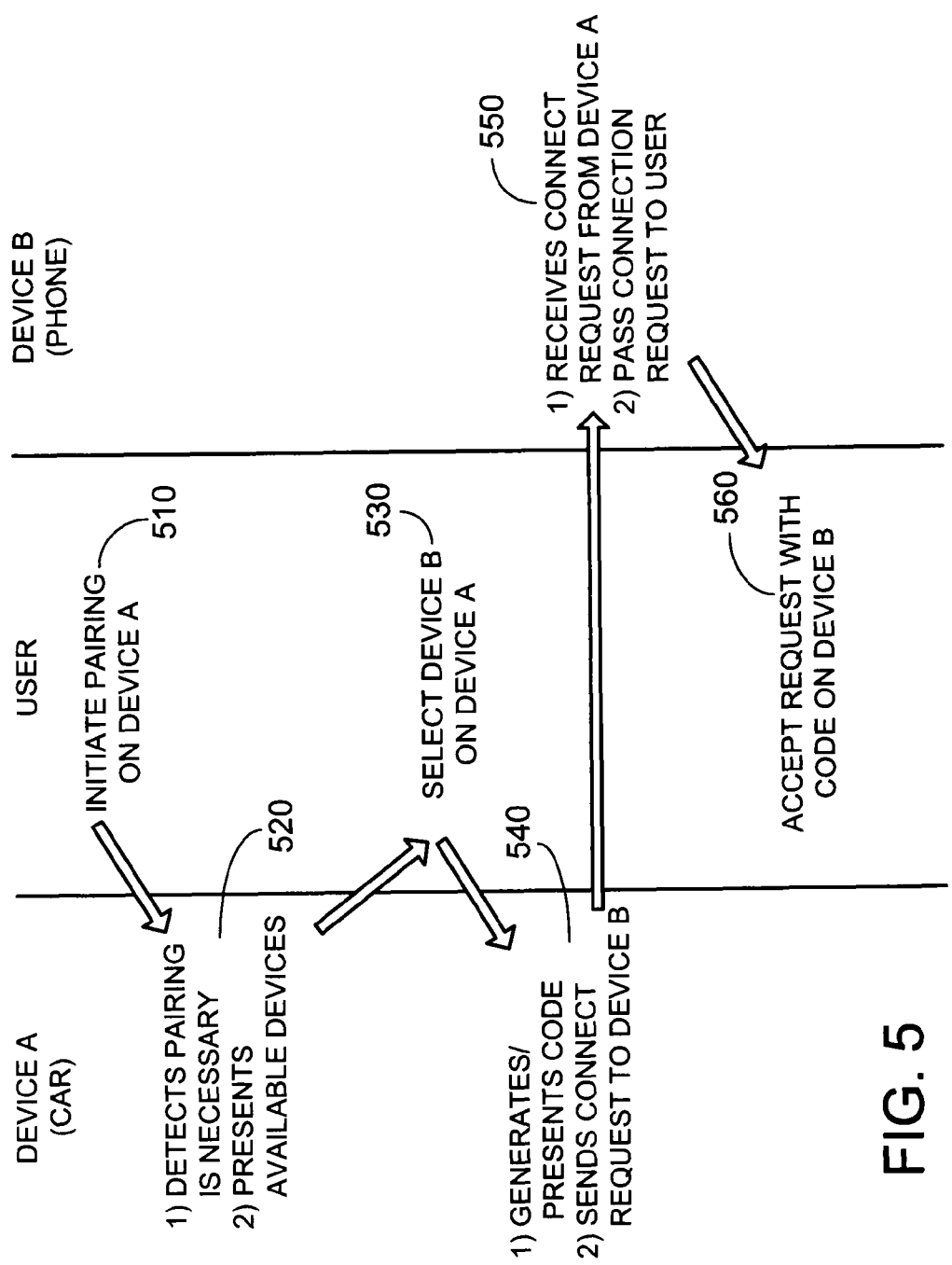

FIG. 1 is a block diagram.
FIG. 2 is a block diagram.
FIG. 3 is a flowchart.
FIG. 4 is flowchart.
FIG. 5 is a timing diagram.

Referring to FIG. 1, an automotive system provides an integrated user interface for control and communication functions in an automobile or other type of vehicle. The user interface supports voice enabled interactions, as well as other modes of interaction, such as manual interactions using controls such as dashboard or steering wheel mounted controls (e.g., buttons, knobs). The system also includes interfaces to devices in the vehicle, such as wireless interfaces to mobile devices that are brought into the vehicle. The system also provides interfaces to information sources such as a remote server (i.e., systems that are not hosted in or mobile with the automobile), for example, for accessing information.

A head unit 100 of the system is linked to other elements that enable interaction with a user (the driver or another person) in the automobile. In the exemplary version of the system illustrated in FIG. 1, a graphical display 110 provides graphical output (or other visual cues) to the user. The user can provide manual inputs using inputs 112, which may include buttons (e.g., on the center console, the steering wheel), configurable ("soft") buttons on the display, and the like. A microphone or microphone array 114 and speaker 116 enable audio input and output, respectively, with the system. The head unit 100 includes communication interfaces with external devices, such as a mobile (e.g., cellular) telephone 120, and personal digital assistant (PDA) 122, an embedded phone 123, and a portable personal computer 124. In this version of the system, the communication link uses a wireless approach that uses the Bluetooth standard. Other wired or wireless approaches can alternatively be used for such communication links. The external devices can include separate user interfaces through which the user can interact with those devices. Some of the external devices, such as the mobile telephone 120, provide a communication link to an external communication system, such as to a wireless network. The system also includes a remote data interface 118, for example a wireless data transceiver, which provides a communication link to a remove server 140.

Referring to FIG. 2, the head unit 100 includes profile data 240 for one or more users. The profile data allows the system to adapt or be customized to individual users. The head unit 100 also includes a voice enabled subsystem 210, which enables voice based interactions between the system and the user, for instance using automatic speech recognition (ASR) and text-to-speech synthesis (TTS). The voice enabled subsystem 210 makes use of speaker-independent (SI) speech configuration data 212, which includes information related to spoken commands that can be issued by the user and characteristics, such as word pronunciations, related to those commands, and other components, which are generally not specific to any particular user. The voice enabled subsystem 210 and SI speech configuration data 212 are described in more details below. The head unit also includes a text-to-speech subsystem 220 for translating a conventional text representation of language into its spoken equivalent, using linguistic rules and dictionaries, so as to achieve the natural sounding speech output. The input text may be inputted in various ways such as via a keyboard or controls (buttons, knobs etc) on dashboard or steering wheel or may be read from various types of files from: word processor files, web pages, data base records, email messages etc. The head unit also includes a speaker verification subsystem 222 for authenticating a user based on user spoken input.

It should be noted that although in the exemplary system, profile data 240, voice enabled subsystem 210, SI speech configuration data 212 are all shown located in head unit 100, above subsystems and data (e.g., profile, speech configuration data) alternatively can be located in various different physical components.

In one example, the voice enabled subsystem 210 makes use of ASR and TTS software from ScanSoft, Inc., headquartered at Burlington, Mass. 01803. ScanSoft ASR engine supports continuous input speech (as compared to requiring discrete utterances of single words), use of command-and-control grammars (as compared to dictation of unconstrained spoken text), speaker-independent configuration, and the capability to adapt the configuration to a user, for example, using additional utterances to train configuration information for particular words. The exemplary voice enabled subsystem 210 built upon ScanSoft ASR engine includes the following components:

- A feature extractor, which converts voice input into a series of acoustic features, each of which is represented as a numerical vector representing characteristics of the voice input in a limited time region.
- Acoustic models that provide mathematical representations of various voice sounds in a language, for example, based on statistical distributions of the acoustic features for particular sounds. An acoustic model can be general to a class of people or specific to one or a small group of people. For example, speaker independent (SI) models are based on data collected from many people's voice samples, while speaker dependent models are based on data collected from one person's voice samples. SI models can be representative of a class of people, for example, being gender or age dependent (e.g., male models, female models, or children models, etc.). The sounds that are represented in the acoustic model can be associated with particular words (e.g., not necessarily based on the linguistic structure of the word), syllable based, phoneme based, or context-dependent phoneme based.
- Grammars which describe valid phrases that can be spoken, or rules that determine which sentences can be spoken. For example, a grammar can be represented using a text representation (e.g., BNF, Backus-Naur Form).
- Dictionaries which provide a mapping between words and representations of those words or whole phrases in terms of the sounds represented in the acoustic model. For example, in the case phoneme-based acoustic models, the dictionary lists phonetic transcriptions of words or phrases each represented as a sequence of phonemes, as a list of alternative sequences, or as a network in which each path represents a particular sequence (for example, by labeling arcs in the network with phonemes). Dictionaries, as with acoustic models, can be general or specific. For example, in one version of the system, a SI dictionary is used, as well as SD exception dictionaries for words not initially found or suitably represented in the dictionary.
- A grapheme-to-phoneme (G2P) module, which is an automated system that converts a written text string into a dictionary-like transcription.
- A runtime configuration engine that combines a grammar, and one or more dictionaries (e.g., an SI dictionary and an exception dictionary) to compute runtime configuration data.
- A recognition engine which compares the voice input features with the acoustic models according to the runtime configuration data, so to provide the best match as result.

In the above exemplary voice enabled subsystem, SI speech configuration data 212 includes a dictionary and a grammar. Depending on specific implementation of the voice enabled subsystem 210, the SI speech configuration data 212 may include more or fewer components.

The profile data 240 for a user includes contact data 242, for example, that includes names of people (or equivalently, locations, business entities, etc.) and other associated entries such as phone number, address, point of interest (POI), calendar or schedule, and any entries for providing information about the person or POI such as memos describing POI events and past visiting experience. The profile data 240 also includes speaker-dependent (SD) speech configuration data 244, which is specific to that user. As is described more fully below, the SD speech configuration data 244 includes information that may improve the accuracy with which the voice enabled subsystem 210 is able to recognize a user's utterances, for example, by including user-specific pronunciations of names spoken by the user. In general, the SD speech configuration data 244 includes the modified or updated portions of the configuration data from the ASR engine due to the training, such as user-specific word transcription entries in dictionary and recompiled grammars in the exemplary voice enabled subsystem.

The head unit 100 also includes a wireless subsystem 230, which provides communication services for establishing and maintaining communication with the external devices, such as with a mobile telephone 120. The wireless subsystem 230 and the mobile telephone 120 include pairing modules 232 and 252, respectively, which implement procedures for establishing the communication when the external device (e.g., telephone 120, PDA 122, or computer 124) is in proximity to the head unit 100. Details of the pairing procedure are discussed later in this description.

The external devices that can be coupled to the head unit 100 optionally include data that is used by the head unit 100. For example, as illustrated in FIG. 2, the mobile telephone 120 includes contact data 250, which may includes names and corresponding telephone numbers, and optionally additional information such as the street address of the contacts (e.g., people, places, or entities known to the user). In one mode of operation, such contact data 250 is transferred to the head unit 100 through the wireless subsystems 230 when the mobile telephone is in communication with the head unit 100 and is used to update or populate contact data 242 of a user's profile data 240.

Contact data 242 in the head unit 100 is provided to the unit in a variety of ways such as from a CD/DVD, a hard drive, a remote server, a PDA, a cell phone etc, and is used for tasks such as hands-free name dialing. The head unit can accept voice enrollment of the contact data as well as text-based enrollment, for example, based on data provided from an external device. In voice enrollment, a user can speak the name and number in an automobile, and the head unit records (e.g., processes and stores a processed representation of) and registers those names and corresponding numbers. The voice enabled subsystem 210 of the head unit then uses these recorded names for tasks such as voice enabled dialing in which the user later speaks a previously registered name and the system dials the corresponding number through a cellular telephone coupled to the head unit.

Referring to FIG. 3, in text-based enrollment, names (e.g., people, places, entities, or other items (e.g., titles of songs or audio disks) are provided to the head unit as input 310 (i.e., in text form), and the system augments the SI speech configuration data 212 to accept and recognize spoken utterances that include those names. The voice enabled subsystem 210 then makes use of the SI speech configuration data 212 to process a spoken user input 330. The voice enabled subsystem can also make use of a spoken user input 330 to determine SD speech configuration data 244. One example of this is a voice enrollment mode where rather than providing text input 310, the user speaks commands or names that are to be recognized by the system. In other examples, some of which are discussed further below, the spoken user input 330 is used to update the SD speech configuration data 244, which is used in conjunction with the SI speech configuration data 212. In one scenario, when recognition using the SI speech configuration data 212 alone is not successful, voice enrollment is initiated to update the SP speech configuration data 244. In this way, only selected portions of the configuration data need to have SD components, providing the convenience provided by text enrollment and accuracy provided by SD configuration data obtained using voice enrollment.

As one example of text-based specification of names or commands that may be recognized by the system, when the head unit 100 communicates with external devices, text-based information (for example, spelled out representations of names or other words) is downloaded to the head unit, such as from contact data 250 in a mobile telephone 120. The voice enabled subsystem of the head unit then makes use of an automatic method of determining pronunciations ("phonetic spellings") of the text information, for example, a dictionary lookup 320 or an automatic grapheme-to-phoneme procedure 322, and enables the system to accept and process spoken commands that include names or other words from the text enrollment. For example, conventional SI speech recognition techniques are used for processing the text information and for recognizing user utterances that include words (vocabulary) based on the text information.

In addition to voice-based and text-based approaches for enrollment, the head unit 100 makes use of further approaches to enrollment of vocabularies that the user may use in spoken commands. Some of these further approaches aim to address issues related to accuracy of pronunciations used by the speech subsystem for words that are accepted by the system. For example, these issues may relate to standard pronunciations that are difficult to predict, or to pronunciations that are particular to the user, for example, due to a foreign accent, or more generally based on national, regional, cultural, or linguistic background of the user.

One approach used by the voice enabled subsystem 210 to determine pronunciations of words from text representations involves accessing a SI dictionary. For words in the SI dictionary, the pronunciations are used by a speech recognition engine when processing audio input from the user to determine whether utterances involving those words were spoken. It may be impractical to include a dictionary that is large enough to cover all names or new words that are dynamically added to the system, for example, as a result of downloading from an external device. A second approach used by the voice enabled subsystem 210 involves executing an automated grapheme-to-phoneme (G2P) procedure to accept a text representation of a word and to output a representation of the type used in the dictionary. The dictionary and speech configuration data for a G2P procedure are included in SI speech configuration data 212, which is not typically specific to any particular user.

Name recognition can be challenging due to the fact that the pronunciation of a name cannot always be accurately predicted beforehand. Similarly, a G2P procedure is not generally specific to characteristics of a user, such as to his or her native language and culture.

The voice enabled subsystem 210 can use a combination of SI speech configuration data 212, which is not necessarily specific to any particular user, as well as SD speech configuration data 244 from a specific user's profile data 240. For example, the two types of configuration data are used concurrently to recognize a spoken user input. Alternatively, the SI configuration data 212 can be used first, and depending on a match or score determined in that use, the SD data 244 is then used, or recognition scores based on SI speech configuration data 212 and SD configuration data 244 are compared and one will be selected based on comparison.

One approach to speech recognition uses two steps to determine user-specific pronunciations. First, a set of multiple pronunciations for a word is determined either from a dictionary that includes variants, or from a G2P procedure that produces multiple variants, for example, in a network representation. In a second step, the single best (or more generally, a best matching subset of multiple) matching pronunciation is selected, for example, based on spoken input from the user.

When the system makes use of SD speech configuration data 244 for a specific user, in some versions of the system, it also maintains support for SI configuration data 212. In this way, if the system is using a user's profile data, but another user speaks a command, that other user's utterance can be recognized even if the user associated with the profile data has a very particular configuration.

Another approach to generating the SD speech configuration data 244 depends on a user's spoken input. For example, the voice enabled subsystem 210 provides a capability to correct some of the inaccurate speaker-independent phonetic transcriptions that may arise through sole use of a speaker independent dictionary. This capability makes use of the user's utterances in determining the pronunciation to use in automated speech recognition. One such approach is to require the user to speak all new names in order to determine the pronunciation to use in recognition. Preferably, the system trains the user's name pronunciations automatically and makes a decision as to whether to use SI dictionary/rule or to determine a user-specific pronunciation for the user without necessarily requiring the user intervene or be aware of the process.

In one version of the system, an SI dictionary and G2P procedure are used to form phonetic representations of all the words in a recognition grammar, such as the grammar for a particular voice task. An example of such a task is voice dialing in which the user can say a name in the context of a longer command (e.g., "Please call John Smith"). In addition, the system supports use of an exception dictionary that is specific to a particular user. One use of the exception dictionary is to include additional representations of particular words. For example, if a user has a particular way of pronouncing "Smith", the exception dictionary may be configured by the system to include an exception entry for that word. When the runtime configuration engine computes the runtime configuration data for use by the engine, in representing the word "Smith" in the recognition grammar, the runtime configuration engine includes both the SI pronunciation and the exception pronunciation. Alternatively, only the exception pronunciation is used to generate the runtime configuration data. Alternatively, to accommodate a user-specific pronunciation of a name, the system introduces a new word in the exception dictionary, such as Smith-1, and modifies the grammar to allow both the original Smith as well as the Smith-1 word. Therefore, even if the exception dictionary takes priority over the SI dictionary, both forms of the word will be accepted by the recognition engine when processing an input utterance. In the discussion below, updating the dictionary may correspond to adding or updating an entry in the exception dictionary as described above.

Referring to FIG. 4, a process implemented by the voice enabled subsystem 210 (see FIG. 2) involves accepting a spoken user input 330 (see FIG. 3) in operation (i.e., not necessarily in a training mode) and depending on this input, possibly updating of a user-specific dictionary that includes user-specific pronunciation of one or more words in the utterance. In this process, an utterance that includes a word or phrase such as a name from the user voice command is recognized by the voice enabled subsystem (step 410). The engine provides a score that indicates the degree to which the recognized hypothesis matches the utterance in the form of a confidence $C1$ (or other form of score) associated with the hypothesis. If the confidence exceeds a preset threshold $T1$ (step 412), the system proceeds without updating the dictionary (branch to step 440). If the confidence is below a second lower threshold $T2$ (step 414), the system rejects the utterance (step 430) without updating the dictionary. However, when the confidence $C1$ is within the range defined by the two thresholds, the system enters an "undecided" state 420.

In the "undecided state," the system verifies the correct answer from the user (step 422), for example, using further prompts and spoken or other mode inputs from the user to confirm the hypothesis, or implicitly because the user accepts rather than cancels an action based on the recognized answer. When the response(s) from user verifies that system didn't recognize correctly the word/phrase, no action will be taken to update the user's personal pronunciations. When the response from user verifies that system recognizes correctly the right word/phrase, but without high confidence, (step 424) the system enters a training mode in which the SD configuration data is updated (step 426). In this training mode, the system processes the utterance and updates the user-specific dictionary based on the utterance. For the exemplary system built upon ScanSoft ASR engine, the training involves following steps:

Collect user utterances or use previously saved utterances

Generate user word transcription

Add user word transcription into the (exception) dictionary

Recompile grammars that use the words.

The engine will use the new grammar to recognize voice inputs.

In some embodiments, when the user later utters the same word or phrase, if the difference between confidence using updated SD dictionary $C2$ and confidence using SI dictionary $C1$ is greater than a predetermined threshold ($T3$), updated SD dictionary will be used, otherwise, SI dictionary will continuously be used.

The voice enabled system 210 provides another capability that may improve accuracy of spoken inputs of names. In general, the approach involves the user adding additional information when speaking a name, for example, by appending additional information such as an initial after the utterance of the name, as in "John Smith J. S." The additional information can be redundant, such as in the case of the initials which are derived directly from the name or other information that is uniquely determined from the name, or can be disambiguating information, for example identifying the specific instance of "John Smith" in a contact database that has multiple entries associated with that name. In an input task in which the user selects a contact from the contact data, the contact data is used to construct a recognition grammar that accepts utterances with such additional information. The user calls a contact by calling the name, for example, "call John Smith." However, for a name which is not common and/or confusable, the engine may not recognize it accurately. The extra information, for example consisting of two letters, is used by the speech recognition subsystem to distinguish the correct recognition hypothesis from incorrect misrecognized hypotheses.

Another example based on this approach is as follow:

System: Name and Number please.

User: Bob Smith at home.

System: I am sorry, please speak again.

User: Bob Smith at home phone.

System: I am so sorry, let's try it another way, please say the person's name followed by the first and last initials.

User: Bob Smith B S at home.

System: Calling Bob Smith at home.

In the approaches described above in which contact data is provided by an external device, the data may be incomplete. For example, address information (which may be needed by a navigation component) may be missing from a user's contact data while the phone number is present. A feature of the system is that missing information can be automatically or manually added to the data in the head unit. This is accomplished by accessing an external information source, for example at a remote server 140 (see FIG. 1). For example, a "white pages" directory that is accessed over the Internet via a wireless network system. The missing information that is added can be used in speech commands, for example, as in "call John Smith who lives on Maple Street first," or "call John Smith whose work phone number is 508-555-1212." Such more complex spoken inputs may achieve higher accuracy in automated recognition. For difficult recognition problems (e.g., two John Smith), the system can still provide speaker independent mode and doesn't have to switch to tedious speaker dependent mode due to the usage of these extra information. For example, call "John Smith on Oak Street" vs. call "John Smith on Water drive".

The missing information can also be used by other subsystems such as a navigation system. For example, a user can speak out POI (such as a restaurant) name, the system will automatically extract address information from the contact data and command the navigation subsystem using the extracted address information. Multiple entries (cell, home, work phone numbers, preferred contact list etc.) for each contact data record can all be presented to the user either for user to select or for the system to take advantage of. In some aspects, when the user provides a telephone dialing command (or other type of command related to communicating with a particular destination), for example by speech (e.g., a spoken name or digit sequence) or by manual input, the navigation system can automatically determine a navigation route to or a map showing a location associated with the telephone dialing command In another aspect of the system, a speaker identification capability is used to determine which of a stored set of users is interacting with the system. This speaker identification sets user-specific preferences for the system. The preferences can include user-specific contact data, user-specific pronunciations, or other preferences. Various techniques can be used to determine which user is interacting with the system. For example, a particular external device that is paired with the head unit (e.g., a mobile telephone) can be used to identify the user. The speaker verification subsystem 222 can also be used for user identification. Other suitable techniques, such as password, fingerprint, face recognition etc are alternatively used.

Speaker identification can make the system more user-friendly and capable of providing personalized service. Furthermore, the speech interface can make use of information associated with the systems being controlled. In this way, the user interface can be made more "intelligent." As another example, instead of repeating "Please say it again", when the speech recognition subsystem does not recognize the work or phrase spoken by the user, the subsystem can provide a list of possible alternatives based on user preference and history: "Do you mean John Smith or John Steve". The correct answer from the user can be further utilized to train the engine to generate speaker-dependent grammar and dictionary as described above.

In a spoken user interface system, it can be desirable to provide feedback of the state of the system to the user. For example, it can be useful to provide feedback that the system is in a "listening" state. In an automotive application, it is also desirable for the driver to not have to look away from the road to carry out user interactions. One approach is to provide audio feedback, for example, in the form of tones and beeps or in the form of recorded or synthesized prompts. Another approach is to provide visual feedback that does not require that the driver look away from the road. More specifically, a visual indicator is generated by the head unit that can be perceived by the driver using his or her peripheral vision. One example of such a visual indicator makes use of a relatively large area, such as substantially the entire area, of a graphical display. A visual color or intensity change across the area is used to indicate the state of system. For example, a particular color is used to indicate that the system microphone is ready to listen to user's voice inputs. The area and color are sufficiently noticeable to the users without the user having to look directly at the display, for example using his or her peripheral vision.

In another aspect of the system, the head unit alerts the user when it detects noise conditions in which the speech recognition engine is likely to encounter difficulty. The system measures the noise level and alerts the user when speech recognition is not recommended. The system measures the acoustic noise level in the cabin and informs the user if it gets too noisy in cabin when the user tries to use speech recognition input. The alert can be in the form of audio, video or visual indicator as discussed above. The system can further transit, by switching automatically or recommending to the user for selection, to another mode of commanding. In general, the mode transition may be triggered by an event, for example, from speech interface to manual input via touch screen on a display when excess noise is detected within the vehicle. In further another aspect of the system, the transition can be made smooth and continuous such that the system can track the state of user interaction with the system and continue the user commanding experience. For example, the user was speaking a phone number by using the speech interface but had not completed it due to noise triggered mode transition, the system can port un-complete spoken phone numbers and show them on the display for the user to continue and complete the call when transiting from speech interface mode to manual input mode.

In general, the interfaces for user interaction contain multiple modes of inputs such as voice, touch, display and other sensors, the system only presents, by displaying or showing, the mode-in-use related information to avoid burying user in huge amount information even those which are not necessary for commanding in current mode-in-use as in prior art. For example, when in speech interface mode, the touch input such as the soft keys on the display will not be shown, when an audio source, such as a hard drive, is selected, neither FM nor AM will be shown on the display. One example of providing such multi-modal user interface involves accepting a first part of a command in a speech input mode. A condition associated with the user interface is detected. For example, a high noise level is detected. The system determines that a manual mode should be used based on the noise level. A second part of the command is then accepted in the manual mode. The first and second parts of the command can form a smooth and continuous transition, for example, without requiring that the first spoken part of the command be repeated using manual input.

In another aspect of the system, the head unit restores environmental settings that are changed during a "voice command" sequence. Such environmental settings can include fan speed, or music volume. For example, the head unit may turn down the volume of music, or reduce the speed of a fan during speech input, and restore them when the spoken interaction is over.

Another aspect of the head unit 100 relates to providing an interface to external devices, in particular using the Bluetooth wireless communication standard. According to protocols specified by the standard, when two Bluetooth devices are "paired", they can share data, and send control signals to one another. For example, an in-vehicle speech interface unit may communicate with a PDA or cellular telephone via Bluetooth to download the contact list stored in the device. Typical approaches to the pairing process require the introduction of two devices to each other in a secure manner. One device "discovers" the other, and a common code is passed between the two devices.

The head unit implements a simplified pairing process which can improve the efficiency of the pairing, generally, by putting intelligence into one of the devices to simplify the steps and ease the burden on the user. Referring to FIG. 5, an example of such a simplified pairing process involves a sequence of interactions as follows. In this example, "Device A" is the head unit and "Device B" is, for example, a mobile telephone.

1) The user initiates pairing on Device A (step 510) by pressing a button that initiates an interaction with a Bluetooth device. For example, in a hands-free phone application, in which the head unit is to be paired with a portable mobile telephone, the user presses a talk button that is coupled to the head unit. The user does not need to be aware of any special pairing sequence.
2) Device A automatically detects that pairing is necessary (step 520), searches the area for available devices, and presents the options to the user. For example, the head unit displays a list of devices (e.g., a mobile telephone and a PDA) in the vehicle.
3) The user selects Device B on the user interface of Device A (step 530).
4) Device A automatically generates a random code, presents the code to the user, such as via a display which may be device A display or a separate display such as the head unit display, and sends a connection request to Device B (step 540).
5) Device B receives the connection request from Device A. The user has the option of accepting the request with the random code (step 550).
6) The user accepts the request on Device B (step 560).

This approach can avoid the need to set both devices to a pairing/discovery mode.

The head unit provides an interface for a number of systems in the automobile. Two such systems include a navigation system and a mobile telephone system. An aspect of the system is that downloaded contact information can be used in configuring the user interface and associated system. This configuration can include providing a capability to enter navigation destination information based on the contact information. For example, a person's name may be used as a specification of a destination for navigation. In some scenarios, the corresponding address information is not available in the downloaded information from the external device and is rather downloaded from a remote information provider, such as a telephone "white pages" system. Another capability related to availability of contact information relates to specification of a party to call based on a combination of a name and other related information, such as "John Smith on Main Street," or "John Smith at the office." The additional related information can be used to disambiguate the number to call, and can improve recognition accuracy even when there is no ambiguity based solely on the name.

Another aspect of the system is that information such as text from navigation database as shown on a display: street name, direction (right, left, straight etc) can be provided to the driver in voice via Text-to-speech conversion. For example, instead of and/or besides showing on navigation map street name and distance away from it, the voice enabled subsystem can say "Please turn left on main street in next quarter of mile". In one implementation, the highlighted "main street" can be obtained via TTS while others can be pre-recorded.

One or more of the aspects described above can be implemented in various versions of the head unit. That is, combinations of the capabilities can be combined in different embodiments. The system is applicable in various types of vehicles, and in other non-vehicle user environments. The head unit can be implemented using hardware, software, or a combination of hardware and software. The software includes instructions that are stored on a medium, such as in a read-only-memory or on a disk drive, and that can be executed on a processor embedded in the head unit.

It is to be understood that the foregoing description is intended to illustrate and not to limit the scope of the invention, which is defined by the scope of the appended claims. Other embodiments are within the scope of the following claims.

What is claimed is:

1. A method for providing a voice enabled user interface comprising:
    storing general configuration information for the interface;
    storing user-specific configuration information for the interface;
    processing a speech input from a user using the general configuration information and the user-specific configuration information; and
    selectively updating the user-specific configuration information based on a result of processing the speech input wherein the updating is performed upon correct recognition of the speech input when a first score associated with the speech input indicates that an incorrect recognition hypothesis has a second score within a predetermined threshold.

2. A speech recognition system, comprising:
    a storage containing general configuration information for a user interface and user-specific configuration information for the user interface; and
    a speech processor configured to:
        accept a speech input from a user and use the general configuration information and the user-specific configuration information, and
        selectively update the user-specific configuration information based on a result of processing the speech input,
        wherein the updating is performed upon correct recognition of the speech input when a first score associated with the speech input indicates that an incorrect recognition hypothesis has a second score within a predetermined threshold.

3. The method of claim 1 wherein the updating is performed without requiring further speech input from the user.

4. The method of claim 1 wherein the user-specific configuration information includes user-specific pronunciation information for lexical items for which general pronunciation information is included in the general configuration information.

5. The method of claim 1 wherein updating the user-specific configuration information is performed during use of the interface.

6. A machine readable medium bearing instructions that when executed cause a processor to:
    store general configuration information for the interface;
    store user-specific configuration information for the interface;
    process a speech input from a user using the general configuration information and the user-specific configuration information; and
    selectively update the user-specific configuration information based on a result of processing the speech input,
    wherein the updating is performed upon correct recognition of the speech input when a first score associated with the speech input indicates that an incorrect recognition hypothesis has a second score within a predetermined threshold.

* * * * *